United States Patent [19]
Mattson

[11] 3,989,429
[45] Nov. 2, 1976

[54] REINFORCED MEMBRANE

[75] Inventor: William Frank Mattson, Hinckley, Ohio

[73] Assignee: The B. F. Goodrich Company, Akron, Ohio

[22] Filed: Apr. 2, 1976

[21] Appl. No.: 672,964

Related U.S. Application Data
[63] Continuation-in-part of Ser. No. 595,880, July 14, 1975.

[52] U.S. Cl. ................................................ 425/52
[51] Int. Cl.² ......................................... B29H 5/18
[58] Field of Search ................. 425/49, 50, 51, 52, 425/53

[56]     References Cited
       UNITED STATES PATENTS

| | | | |
|---|---|---|---|
| 1,642,541 | 9/1927 | Ellinwood | 425/52 X |
| 2,452,821 | 11/1948 | Wood | 425/812 |
| 2,695,424 | 11/1954 | Madison et al. | 425/53 |
| 2,851,729 | 9/1958 | Kalkofen | 425/53 |
| 3,170,195 | 2/1965 | Knox | 425/51 |
| 3,676,028 | 7/1972 | Christie et al. | 425/52 X |

FOREIGN PATENTS OR APPLICATIONS 938,797  10/1963  United Kingdom................... 425/53

Primary Examiner—J. Howard Flint, Jr.
Attorney, Agent, or Firm—Robert M. Leonardi; Harry F. Pepper, Jr.

[57]     ABSTRACT

A generally annular tire curing membrane has a plurality of interconnected ribs integrally molded on its inside surface. The ribs collectively define a plurality of adjacent polygons. A portion of at least one of the ribs is disposed at an oblique angle to the circumferential centerline of the membrane. The polygons may have an infinite number of sides, thereby having a curved boundary.

10 Claims, 6 Drawing Figures

REINFORCED MEMBRANE

BACKGROUND OF THE INVENTION

This invention is a continuation-in-part of copending United States application Ser. No. 595,880, filed July 14, 1975.

This invention relates to vulcanization devices and more particularly to elastomeric vulcanization membranes.

During vulcanization of many elastomeric articles in a mold, a device referred to generally as a vulcanizing or curing membrane is used to force the elastomeric article firmly against the mold. In the manufacture of pneumatic tires, for example, a curing membrane seats the uncured tire in the vulcanization mold and retains it until properly cured. Hot fluid such as steam or extremely hot water is circulated within the membrane during the curing process. Heat is transferred from the hot fluid through the membrane to the tire, thereby effecting a vulcanization.

Curing membranes, particularly those used in the vulcanization of pneumatic tires, are often referred to as "bladders" or "water bags". The chief distinction between bladders and water bags or "bags" is that the former are generally much thinner and are designed to be much more expansible.

Although water bags may contain a fluid under high pressure, they rarely are designed to expand beyond about 5%, whereas a bladder can be stretched up to about 100% circumferentially and up to about 25% laterally or radially. To accommodate expansions, curing membranes are commonly made of some type of elastomeric material. The elastomeric material must be strong enough to withstand repeated pressurizations, expansions and contractions without splitting or otherwise deteriorating.

The cure time of a tire will vary with thickness of the membrane, among other factors. Since elastomeric materials are a relatively poor conductor of heat, a slight difference in the thickness of a membrane can mean a substantial difference in cure time of a tire. In order to reduce the cure time, attempts have been made to reduce membrane thickness. A buckling problem emerges when the membrane thickness is reduced below a minimum point.

Buckling of a tire curing membrane, particularly a bladder, is primarily due to the frictional sliding forces between the membrane and the uncured tire as the membrane expands and forces the tire against the mold. Many of these forces are applied to the membrane at a portion associated with the bead area of the uncured tire.

Reducing the thickness of a membrane reduces its strength. Below a given thickness, portions of the membrane cannot carry the stress applied to them, causing erratic expansion and possibly causing portions of the membrane to buckle or crease. This can result in an uneven heat distribution to the tire and thus in a nonuniform cure.

In an attempt to decrease the thickness of a curing membrane while still retaining sufficient strength, specially designed reinforcements can be employed. For example, U.S. Pat. No. 2,695,424 discloses a thin walled curing "bag" with ribs on its inside surface. In membranes such as disclosed in U.S. Pat. No. 2,695,424, the curing time can allegedly be reduced because of the thinner bag, while the ribs supply the strength that was lost by decreasing the bag thickness. Unfortunately, since the ribs of a curing bag of the type disclosed in U.S. Pat. No. 2,695,424 work essentially independent of each other, a bladder with such a ribbed design can still buckle or kink due to the more extreme expansion of a bladder. A bag of the type mentioned above expands very little compared to a bladder and therefore stress levels are much lower.

To avoid the aforementioned buckling problems, it is desirable to create a membrane with stress carrying capabilities equal in all directions. Some attempts at reinforced curing membranes have employed rectangular rib patterns such as disclosed in U.S. Pat. No. 2,695,424 and British Pat. No. 938,797. It can be seen that such rectangular rib patterns have maximum stress carrying capabilities only in the two directions parallel to the ribs. These two previous attempts at reinforcing a curing membrane have been aimed at providing maximum stress carrying capabilities only in the circumferential and radial directions of the membrane. Buckling and kinking can still occur in such membranes because stresses are often exerted on the membrane in directions other than the circumferential and radial directions.

SUMMARY OF THE INVENTION

It is an object of the present invention to provide an elastomeric curing membrane which resists buckling or kinking.

It is a further object of the present invention to provide an elastomeric curing membrane that has an increased life.

It is a further object of the present invention to provide an elastomeric curing membrane that resists buckling or kinking and decreases curing time.

These and other objects of the present invention which will become evident by the following detailed description are achieved by a generally annular curing membrane comprising a membrane wall and a plurality of interconnected ribs integrally molded on the inside surface of the wall. Collectively, the ribs form a plurality of adjacent polygons, with each rib being a common side of at least two adjacent polygons. A portion of at least one of the ribs is disposed at an oblique angle to the circumferential centerline of the membrane.

DETAILED DESCRIPTION OF A PREFERRED EMBODIMENT

Figure 1:
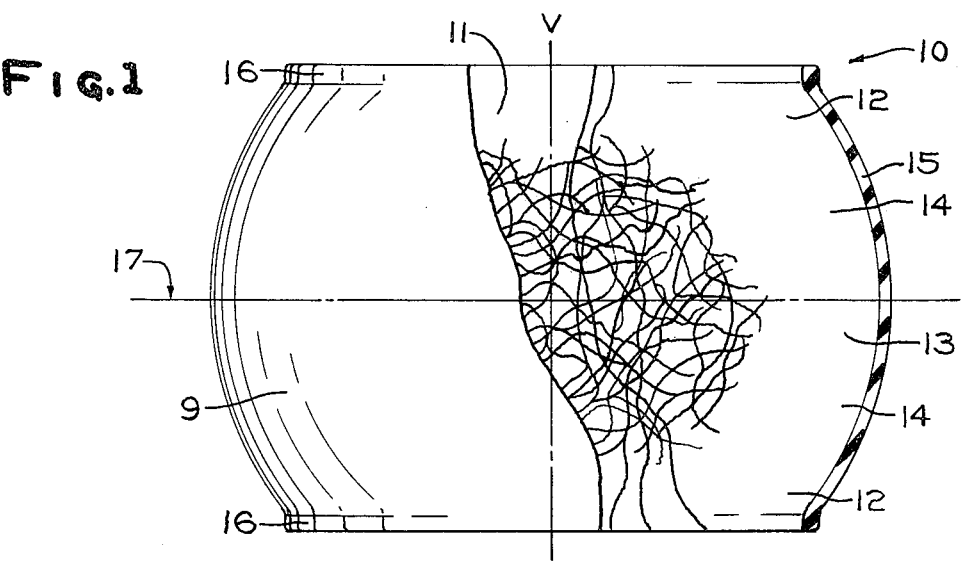
FIG. 1 is a fragmented side elevation of a tire curing membrane of the present invention.

Referring to FIG. 1, a tire curing membrane of the present invention is shown as a bladder 10. The bladder 10 is hollow and has a generally annular or barrel shape. It is formed of a typical high strength elastomeric material such as butyl compound or other similar substance. The bladder 10 is basically comprised of a bladder wall 15 having two end or "bead" portions 12, a middle or "crown" portion 13, and two intermediate or "sidewall" portions 14. The bladder 10 is symmetrically formed about an axis V. The bladder has two parallel and axially spaced margins 16 which define the end portions of the bladder. The plane in which each margin 16 lies is perpendicular to the axis V. The bladder has its largest diameter around the circumferential centerline 17. When an uncured tire (not shown) is fitted over the outside surface 9 of the bladder 10 and the bladder is subsequently expanded, portions of the outside surface 9 expand into direct contact with portions of the uncured tire thereby forcing it against the inner surface of a tire mold (not shown).

Figure 2:
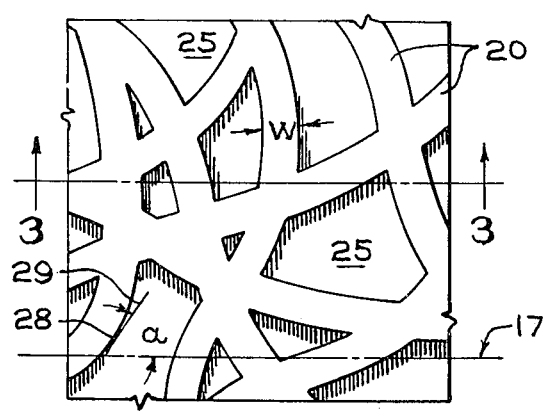
FIG. 2 is an enlarged view of a portion of the inside surface of the membrane of FIG. 1.
Figure 3:
FIG. 3 is a cross-section of the membrane taken along line 3—3 of FIG. 2.

As is more readily seen in FIGS. 2 and 3, a plurality of interconnected ribs 20 providing a network of reinforcement are integrally molded on the inside surface 11 of the bladder 10. Several of the ribs 20 extend from one margin 16 to the other. Collectively, the interconnected ribs 20 define a plurality of adjacent polygons 25. To create desirable stress carrying and heat transfer capabilities, the rib widths W are about equal, forming a tightly fitted pattern of polygons 25, with each rib 20 forming a common boundary of two adjacent polygons 25.

It can be seen in FIGS. 1 and 2 that the ribs 20 extend between each margin 16 in a random fashion. Several of the ribs 20 are curved ribs, thereby giving several polygons 25 smoothly curved boundaries, such as 28. The curved boundaries are comprised of an infinite number of sides. It should be noted that when the word "polygon" is used in this specification and in the appended claims, a polygon having an infinite number of sides is included.

Each rib 20 partially defines at least two adjacent polygons 25. A portion of each polygon is defined by a portion of a rib which is disposed at an oblique angle "a" to the plane of the axially spaced margins 16 and to the plane of the circumferential centerline 17.

For curved ribs, the angle to the margin or to the circumferential centerline at each portion of the rib can be considered as the angle of the tangent to the curved rib at that portion. In FIG. 2, curved boundary 28 has a tangent 29 forming the oblique angle "a" with the circumferential centerline 17. It should be noted that "oblique", when referred to in this specification or in the amended claims, refers to directions substantially nonradial and noncircumferential, notwithstanding that a radially extending rib may be oblique to the plane of a margin or circumferential centerline merely because of the "barrel" shape of the bladder.

A decrease in polygon size from the crown portion 13 to the bead portions 12 may be desired because buckling or kinking of the bladder 10 has most frequently occurred in the bead portions 12. If the rib width W is kept constant as the size of the polygons 25 decreases, more of a ribbed area will exist at the bead portions 12, thereby permitting the bead regions to withstand the higher buckling stresses existent there. Furthermore, a greater nonribbed area in the crown portion 13 permits maximum expansion of the bladder 10 in the crown region where it is required. This maximum expansion will cause the wall 15 to be thinnest in the crown portion 13, permitting a more rapid heat transfer. Because the crown or tread portion of the tire is one of its thickest regions, more heat is desirable there to effect a uniform cure of the tire.

Most of the heat that effects a cure of the tire from the inside passes through the bladder 10 via the nonribbed area. Using narrow ribs 25, heat is more readily passed to areas of the associated tire directly beneath the ribbed areas thereby effecting a more rapid and uniform cure. It is therefore preferred that the bladder 10 comprises a relatively large number of narrow ribs 25 rather than a lesser number of wider ribs giving equivalent strength. Although the percentage of nonribbed area is different at each portion of the bladder 10, overall about 60% of the total area of the inside surface 11 of the bladder is nonribbed. Preferably, the height H of each rib 25 is from about 35% to 40% of the thickness M of the wall 15.

Figure 4:
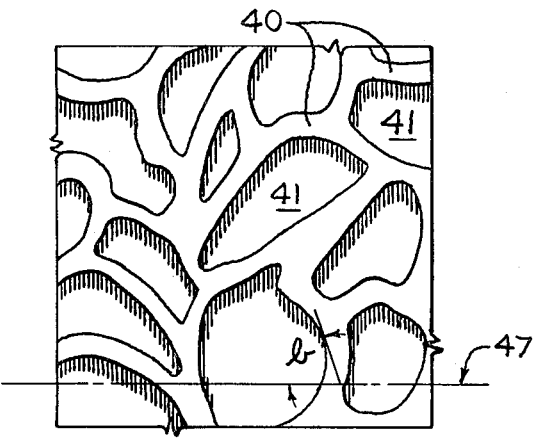
FIGS. 4, 5, and 6 are enlarged views of portions of inside surfaces of alternative embodiments of a membrane of the present invention.

FIG. 4 shows a portion of the inside surface of an alternate embodiment of the present invention. The interconnected ribs 40 define a plurality of adjacent curved polygons 41. Each of the polygons has an infinite number of sides forming a continuously and smoothly curved boundary. A portion of each polygon 41 is defined by a rib 40 which is disposed at an oblique angle "b" to axially spaced margins such as 16 and to the circumferential centerline 47.

Uniform stress carrying characteristics can best be achieved by a ribbed pattern with ribs oriented in as many directions as practical. It may therefore be believed that a pattern of tightly packed circular ribs would be one of the more uniform in stress carrying capability.

Figure 5:
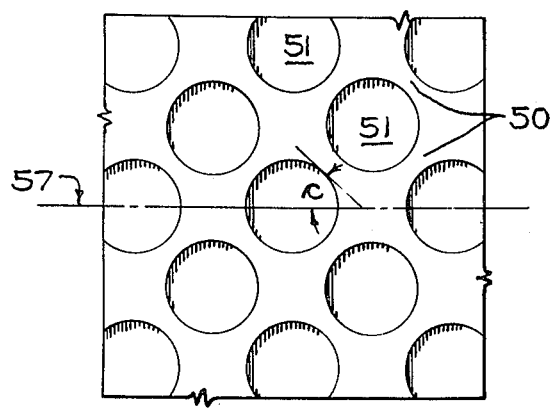

FIG. 5 shows a portion of the inside surface of another embodiment of the present invention having a plurality of interconnected ribs 50. The ribs 50 define a plurality of interconnected circular polygons 51. A portion of each circular polygon 51 is defined by a rib 50 which is disposed at an oblique angle "c" to axially spaced margins such as 16 and to the circumferential centerline 57.

Figure 6:
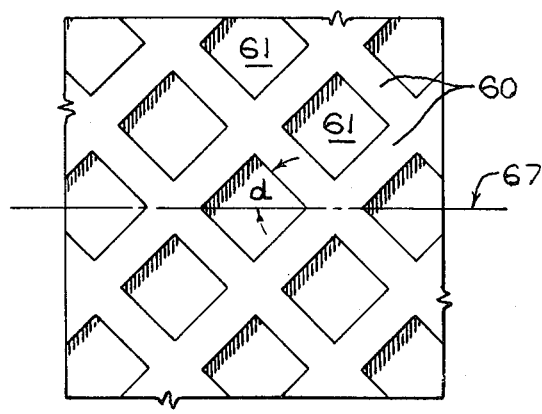

For facilitating the manufacture and design of bladders, and in some instances for the improvement of heat transfer through a bladder, it may be desired to have straight ribs. FIG. 6 shows a portion of the inside surface of an alternative embodiment of the present invention having a plurality of straight interconnected ribs 60. The ribs 60 define a plurality of adjacent four-sided, diamond shaped polygons 61. A portion of each polygon 61 is defined by a rib 60 which is disposed at an oblique angle "d" to axially spaced margins such as 16 and to the circumferential centerline 67. Although the ribs 60 extend in only two general directions, they are oriented such that the bladder has high strength characteristics in the nonradial and noncircumferential directions. These diamond shaped ribs 61 are also desirable because they can be tightly packed together in a uniform pattern. Triangles and hexagons are also very desirable for this reason.

Structural reinforcement on the inside surface 11 of the bladder 10 leaves the outside surface 9 essentially smooth, thereby leaving no undesired marks or patterns on the inside of the tire. Nevertheless, additional patterns or structure may be molded to the outside surface 9 without affecting the usefulness of the inside structure of this invention. For example, air venting or bleeding channels as disclosed in U.S. Pat. No. 3,143,155 may be used.

Another feature of a pattern of close ribs on the inside surface of the bladder 10 is increased heat transfer through the bladder. It is believed that the ribs cause sufficient turbulence of the heating medium, for example, flowing water, to break up a portion of the thermal boundary layer between the inside surface 11 of the bladder and the heating medium, thus more readily permitting heat to pass through the bladder 10.

Although the foregoing structure was described for the purpose of illustrating a presently preferred embodiment of the invention, it should be understood that many modifications or alterations may be made without departing from the spirit and the scope of the invention as set forth in the appended claims.

I claim:

1. A curing membrane of an elastomeric material having a generally annular configuration and a circumferential centerline, said membrane comprising:
   a. a wall having an inside surface;
   b. a plurality of interconnected ribs integrally molded to said inside surface; and
   c. a plurality of adjacent polygons defined by said interconnected ribs, the improvement wherein at least a portion of one of said interconnected ribs is disposed at an oblique angle to the plane of said circumferential centerline.

2. A curing membrane as defined in claim 1 wherein the widths of each of said ribs are essentially equal.

3. A curing membrane as defined in claim 1 wherein at least one of the ribs is curved, said curved rib defining a smoothly curved boundary of at least one of said polygons, the angle of each portion of said curved rib being the same as the angle of the tangent to the curve at that portion.

4. A curing membrane as defined in claim 3 wherein said at least one of said adjacent polygons is a circle.

5. A curing membrane as defined in claim 1 comprising a plurality of adjacent polygons extending essentially over the entire inside surface of the wall.

6. A curing membrane as defined in claim 1 wherein the height of each rib is from about 35% to 50% of the thickness of the wall.

7. A curing membrane as defined in claim 1 wherein the nonribbed area of the inside surface is about 60% of the total area of the inside surface of the membrane.

8. A curing membrane of an elastomeric material having a generally annular configuration and a circumferential centerline, said membrane having a plurality of interconnected ribs integrally molded to its inner surface, said ribs providing a network of reinforcement with portions of said ribs extending obliquely relative to said circumferential centerline.

9. A curing membrane as defined in claim 8 wherein each of said plurality of interconnected ribs forms a plurality of adjacent polygons, each of said ribs being smoothly curved through its entire length.

10. A curing membrane as defined in claim 8 further comprising axially spaced margins extending parallel to said centerline wherein said plurality of ribs extend continuously from one of said margins to the other.

* * * * *